United States Patent
Ahmadi et al.

(10) Patent No.: US 7,272,136 B2
(45) Date of Patent: Sep. 18, 2007

(54) DUAL TONE MULTI FREQUENCY SIGNAL DETECTION

(75) Inventors: Masoud Ahmadi, Harlow (GB); Joachim Fouret, Cambridge (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1179 days.

(21) Appl. No.: 09/776,620

(22) Filed: Feb. 2, 2001

(65) Prior Publication Data

US 2002/0105942 A1 Aug. 8, 2002

(51) Int. Cl.
*H04J 3/12* (2006.01)
*H04L 12/56* (2006.01)

(52) U.S. Cl. ............... 370/356; 370/395.1; 370/395.61; 370/526; 379/93.08; 379/386

(58) Field of Classification Search .............. 370/352, 370/354, 356, 389, 395.1, 395.6, 395.61, 370/401, 465, 522, 525, 526; 375/242, 254; 379/93.01, 93.08, 386, 418
See application file for complete search history.

(56) References Cited

U.S. PATENT DOCUMENTS 5,353,346 A * 10/1994 Cox et al. .................. 379/386
6,075,783 A * 6/2000 Voit ........................... 370/352
6,259,691 B1 * 7/2001 Naudus ...................... 370/352
6,370,244 B1 * 4/2002 Felder et al. ............... 379/386
6,757,367 B1 * 6/2004 Nicol ....................... 379/90.01

* cited by examiner

*Primary Examiner*—Alpus H. Hsu
(74) *Attorney, Agent, or Firm*—Barnes & Thornburg

(57) ABSTRACT

A signalling tone detector for use in a communications network for the detection of dual frequency multi-tone (DTMF) pairs of signal tones in a time division multiplex (TDM) signal. The detector comprises first and second arrays of adaptive notch filters corresponding to the rows and columns of a subscriber's pushbutton key set. Each said notch filter responds to a respective signal tone by the generation of a corresponding output signal. A logic circuit identifies from a combination of output signals from the adaptive notch filters the presence or absence of a pair of signal tones and, when the presence of a pair of signal tones has been identified, for decodes that pair of tones to corresponding digit information. The detector is used in an arrangement for compressing and packetising TDM traffic for transport over a connectionless network. To prevent distortion, the DTMF tones are decoded to digit information prior to transport over the connectionless network.

19 Claims, 9 Drawing Sheets

| 8 | 7 | 6 | 5 | 4 | 3 | 2 | 1 |
|---|---|---|---|---|---|---|---|
| Redundancy | | Time Stamp | | | | | |
| RES | | Signal Level (0 to -31dBm0) | | | | | |
| Digit Type | | Digit Code (0,1,2,...,b,c,d) | | | | | |
| Message Type = 000010 | | | | | | | |
| CRC-10 | | | | | | | |

*Fig. 4*

DUAL TONE MULTI FREQUENCY SIGNAL DETECTION

FIELD OF THE INVENTION

This invention relates to methods and apparatus for the detection and decoding of dual tone multi frequency (DTMF) signals in communications networks.

BACKGROUND OF THE INVENTION

DTMF signalling is used extensively in communications voice networks for the signalling of dialled numbers and for access to services during progress of a call. The signalling tones are generated by a user terminal by the operation of keys on a keypad. Operation of each key causes the generation of a respective pair of audio frequency tones. The pairs of tones are decoded at the system switching centres or nodes to recover the corresponding digits that have been dialled by the subscriber so that routing of a call may be determined or access to an appropriate service may be provided.

Traditionally, voice traffic had been carried on Time Division Multiplex (TDM) networks in which traffic is allocated to 64 kb/s Channels in TDM frames. Such networks are circuit based in nature. However, an increasing volume of long haul voice traffic is now being transported over Asynchronous Transfer Mode (ATM) or Internet Protocol (IP) networks which are connectionless in nature and which transport traffic in cells or packets. In a typical arrangement, voice traffic from a TDM network is packaged into cells at the boundary of an ATM or IP network for transport across that network to a remote TDM network. At the remote boundary of the ATM or IP network, the TDM frame structure is reinstated.

A particular problem with such an arrangement is that of transporting the DTMF signalling tones across the ATM or IP network. At the boundary of the connectionless network, the TDM traffic is packaged into cells or packets using speech compression algorithms which minimise the bandwidth that is required. It has been found that the use of compression algorithms on pure tones, such as DTMF signalling tones, causes distortion of those tones and thus renders their subsequent detection and decoding uncertain. A potential solution to this problem is to detect the DTMF tones at the input to the connectionless network and to decode and convert those tones into corresponding digital information. However, current DTMF tone detectors are relatively slow in operation and may thus allow short bursts of DTMF tones to 'leak' across the connectionless network as compressed speech. This causes significant degradation in the quality of the far-end reconstituted DTMF tones and, in extreme cases, a lead to double detection of tones and/or incorrect detection. Further, some DTMF tone detectors can respond incorrectly to other signals such as fax and modem tones, or even to speech tones of a similar frequency.

The conventional DTMF detectors currently in use require one hundred and two samples for detection (taking 12.75 milliseconds) and a further one hundred and samples (taking a further 12.75 milliseconds) for decoding using a Goertzel algorithm. This process thus requires a total time of almost twenty six milliseconds. This is significantly in excess of twenty milliseconds which is now the generally accepted absolute maximum detection time that is necessary to overcome the aforementioned problem of tone leakage as compressed speech. A maximum detection time of 20 milliseconds is specified by ITU Recommendation I.366.2.

SUMMARY OF THE INVENTION

An object of the invention is to minimise or to overcome the above disadvantages.

According to a first aspect of the invention, there is provided a method of transporting voice traffic and audio multi-tone signalling information representing user dialled digits from a connection based network to a connectionless network, the method comprising notch filtering a plurality of signal samples, determining from said notch filtering the presence or absence of an audio multi-tone signal, in the absence of an audio multi-tone signal, compressing and packetising said voice traffic for transport over the connectionless network, and, in the presence of an audio multi-tone signal, decoding that signal to corresponding digit information and transporting that digit information over the connectionless network.

According to another aspect of the invention there is provided a method of transporting voice traffic and audio multi-tone signaling information representing user dialled digits between first and second time division multiplex networks via a connectionless network, the method comprising, at an ingress from the first TDM network to the connectionless network, compressing and packetising said voice traffic at said interface in the form of compressed speech, sampling said TDM voice traffic with a plurality of adaptive notch filters so as to provide an indication of presence or absence of audio tone signal in said voice traffic, and, when the presence of a said tone signal is indicated, decoding that tone signal to a corresponding digit value, and transmitting that digit value across the connectionless network, and, at an egress from the connectionless network to the second TDM network.

According to another aspect of the invention, there is provided an arrangement for transporting voice traffic and audio tone signalling information across an adaptation interface from a time division multiplex network to a connectionless network, the arrangement comprising spew encoding and compression means for compressing and packetising said voice traffic at said, a plurality of adaptive notch filters for sampling said TDM voice traffic so as to provide an indication of presence or absence of audio tone signal in said voice traffic, and logic means for decoding a tone signal to a corresponding digit value when said tone signal has been detected, and means for that digit value across the interface.

According to a further aspect of the invention, there is provided a signalling tone detector for use in a communications network for the detection of dual frequency multi-tone (DTMF) pairs of signal tones from a set of signal samples, the detector comprising; first and second arrays of adaptive notch filters, each said notch filter being adapted to respond to a respective signal tone by the generation of a corresponding output signal, and logic means for identifying from a combination of output signals from the adaptive notch filters digit information filters the presence or absence of a pair of signal tones and, when the presence of a pair of signal tones has been identified, for decoding that pair of tones to corresponding digit information.

According to a further aspect of the invention, there is provided a communications network arrangement comprising a time division multiplex (TDM) network in which narrow band traffic is transported in frames, and a connectionless network in which said narrow band traffic is transported in a compressed form in cells or packets, wherein, within the TDM network, signalling of user dialled digit information is performed by the transmission of dual frequency multi-tone (DTMF) pairs of signal tones, and wherein a boundary between the TDM and connectionless networks incorporates signalling tone detection means comprising a plurality of adaptive notch filters for sampling said TDM voice traffic so as to provide an indication of presence or absence of audio tone signal in said voice traffic, and logic means for decoding a tone signal to a corresponding digit value when said tone signal has been detected, and means for transporting that digit value across the connectionless network.

The arrangement and method provide a means of sampling a TDM signal to provide an early warming indication of the presence of a DTMF tone signal. We have found that the use of notch filtering provides rapid identification of a DTMF signal. This allows decoding of that DTMF signal to be achieved in a time significantly less than the generally agreed twenty millisecond maximum defined in ITU Recommendation I.356.2, and enables measures to be taken to prevent that DTMF signal from being processed as compressed speech.

By transmitting the signalled digits In their decoded form rather than as DTMF tones across the connectionless network, the problem of signalling tone distortion is effectively overcome. At the egress from the connectionless network, the DTMF tones are regenerated.

Advantageously, the power level of the DTMF tone in the incoming signal is measured, and this measurement is transmitted over the connectionless network together with the decoded signal. The DTMF signal is then generated at the appropriate power level on egress from the connectionless network.

The detection of a pair of tone signals may be effected by determining the frequency and power level of each signal of the pair, and comparing the frequency and power level with predetermined reference values.

The detection and decoding process may be performed under the control of software in machine readable form on a storage medium.

The arrangement and method can be employed e.g. at a switch between a TDM network, e.g. a PSTN, and an ATM or IP network. The voice traffic may be transported over an ATM network on adaptation layer two or five (AAL2 or AAL5).

BRIEF DESCRIPTION OF THE DRAWINGS

Embodiments of the invention will now be described with reference to the accompanying drawings in which:

FIG. 4 illustrates a standard DTMF packet format;

DESCRIPTION OF PREFERRED EMBODIMENTS

Figure 1:
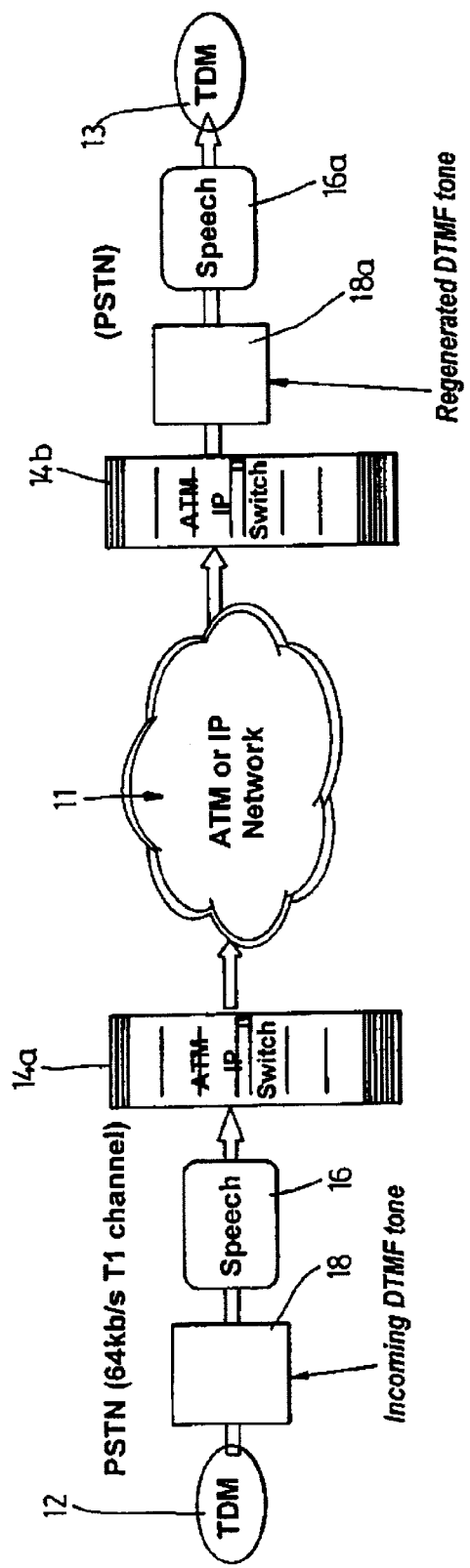
FIG. 1 is a schematic diagram of a communications network arrangement incorporating both TDM and connectionless networks.

Referring first to FIG. 1, this figure illustrates a network arrangement in which a connectionless network 11, e.g. an ATM or IP network transports TDM traffic between a first TDM network 12 and a second TDM network 13. Switches 14a, 14b are provided been the connectionless network 11 and the TDM networks 12, 13. Typically, these switches will incorporate an ATM or IP switch (not shown). The presence or absence of DTMF tones in the TDM traffic is established in detection windows prior to speech encoding or DTMF tone decoding.

Traffic from the TDM network 12 arriving at the switch 14a includes both speech (16) and DTMF tone (18) signals. At the switch 14a, the TDM traffic is segmented and packaged into cells or packets for transmission over the connectionless network 11. This cell or packet transmission also carries TDM framing information to permit subsequent reconstruction of the TDM frames. The voice traffic may be transported in ATM Adaptation Layer two (AAL2) or AAL5 Type 3 packets.

At the switch 14b, the received cell or packet traffic is reassembled into the TDM format for transmission to the TDM network 13. The reassembly process recovers the speech (16a) and DTMF tone (18a) signals. The transmission and subsequent recovery of the DTMF signals will be described below.

Figure 2:
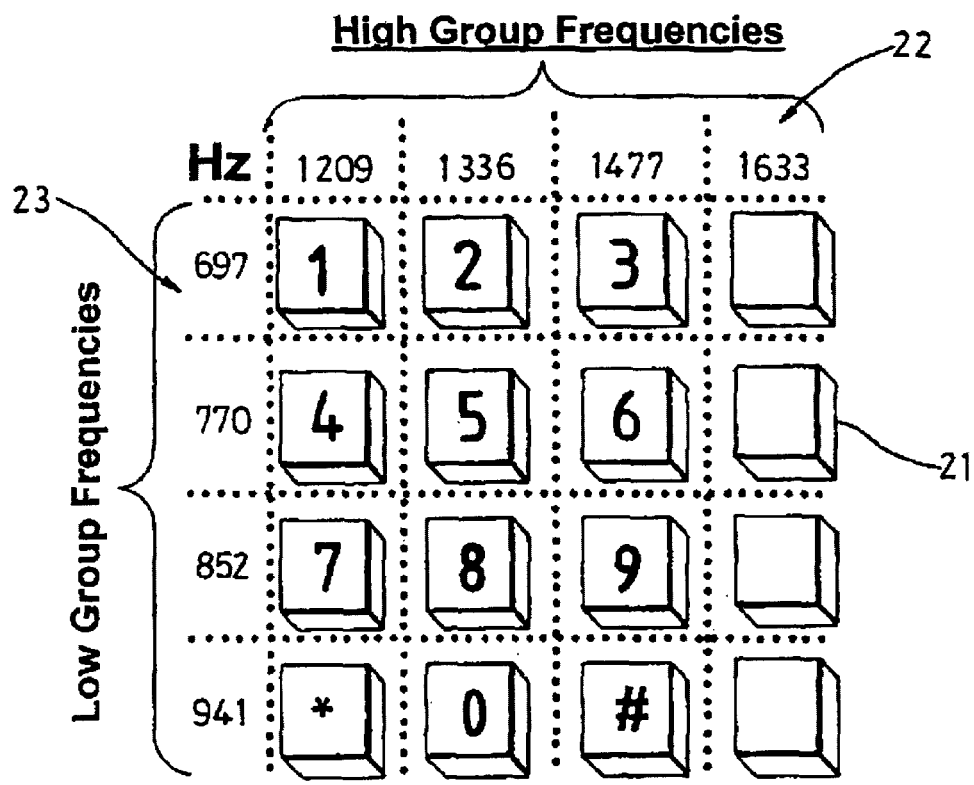
FIG. 2 is a schematic diagram of a keypad arrangement for generating DTMF tones.

Each DTMF signal comprises a respective pair of tones in the audio frequency band. As illustrated in FIG. 2. The signalling tones are generated via a keypad in which operation of each key 21 generates a respective pair or tones, one taken from a set of high group frequencies and the other taken from a group of low group frequencies. For example, operation of the 5 key generates row and column tones having the frequencies 770 Hz and 1336 Hz respectively. At a network node or switch, the presence of this pair of tones is recognised as the dialled number 5. Typically, there are sixteen tonal pairs corresponding to the digits 0 to 9, the * and # symbols, and the letter keys A to D. The tone frequency allocation in FIG. 2 follows the recommendations of ITU Standard Q-23.

Figure 3:
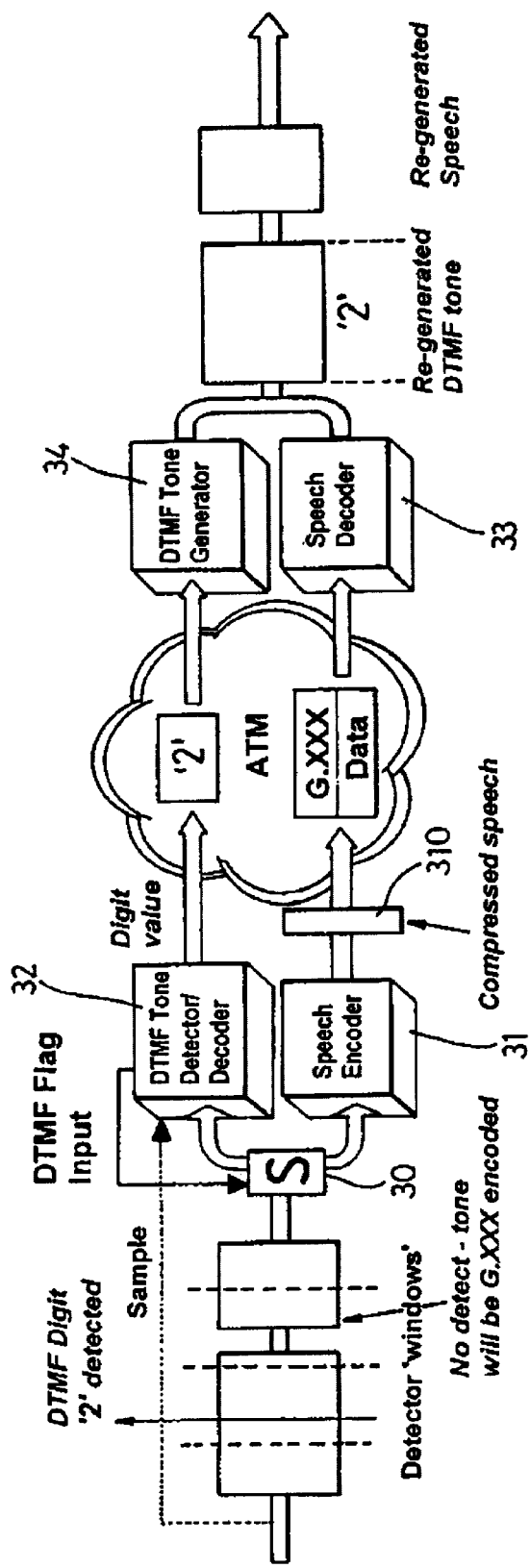
FIG. 3 shows a communications network arrangement according to a first embodiment of the invention.

Referring now to FIG. 3, this shows in schematic form a network arrangement according to a preferred embodiment of the invention. It will be appreciated that for clarity, the adaptation interfaces to the connectionless network 11 are not shown in FIG. 3.

Sets or blocks of signal samples from the TDM network 12 containing speech and DTMF signals are buffered and input to tone detector/decoder 32 to detect the presence or absence of DTMF signals. In the absence of a DTMF signal, the speech traffic is fed via a switch 30 to speech encoder 31 which uses one or more compression algorithms to generate compressed speech 310. This compressed speech is transmitted as data Over the connectionless network and is decoded by speech decoder 33 on egress from the connectionless network. If however a DTMF signal is detected by the detector/decoder 32, a flag is set causing the switch 30 to route the signal to the DTMF tone detector/decoder 32 so that the input to the speech encoder is temporarily disabled. The DTMF signal is decoded to the corresponding dialled digit or symbol value, and that decoded value is transmitted over the connectionless network. On egress from the connectionless network, the decoded digit value is re-encoded by DTMF tone generator 34. The construction of tone detector/decoder 32 will be described below.

The function of the tone detector/decoder 32 is thus to detect pairs of DTMF tones in the incoming TDM channel and, when a pair of tones is detected, to selectively disable the input to the speech encoder 31 to prevent encoding of those tones. The output of the speech encoder thus comprises compressed (tone free) speech. On detection of a pair of DTMF tones, the detector 32 determines the digit corresponding to this pair of tones and transmits that digit to the connectionless network. A preferred packet format for transporting the decoded DTMF signal over the connectionless network is illustrated in FIG. 4. The packet format is in accordance with the recommendations of ITU Standard I-366.2.

Figure 5:
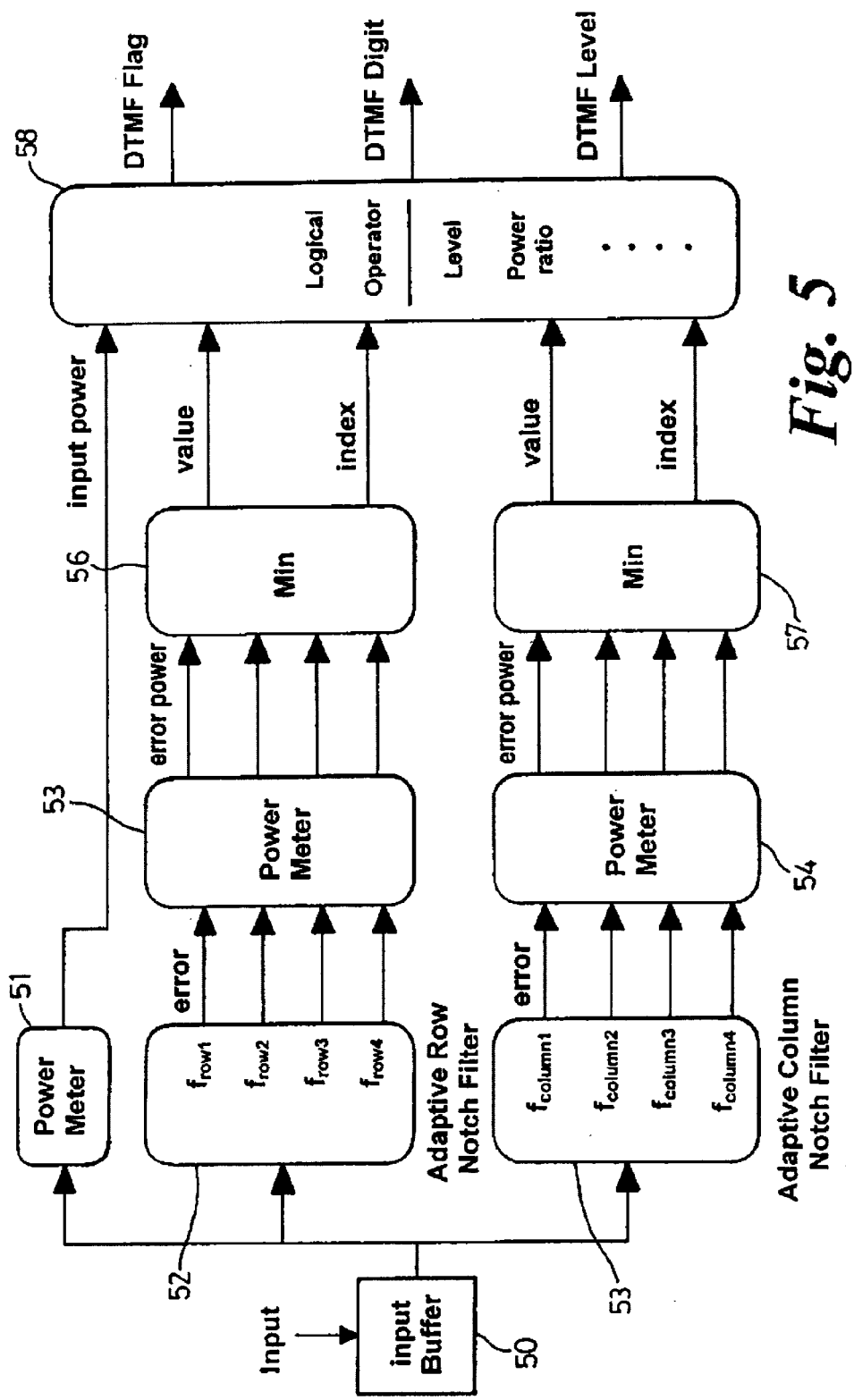
FIG. 5 is a schematic diagram of a DTMF detector and decoder for use in the network of FIG. 3.

Referring now to FIG. 5, this shows the construction of the DTMF tone detector/decoder 32. The input signal from buffer store 50, which may contain DTMF tones and speech is fed in parallel to a power meter 51 and to the first and second adaptive filter arrays 52, 53 which arrays detect the row and column DTMF frequencies respectively. Each filter array comprises four filters each tuned to a respective row or column frequency. The outputs from the adaptive filter arrays, 52, 53 comprise error signals which are fed to respective row and column power meters 54, 55 providing a time average. The error signals each comprise an indication of a match or mismatch between the filter frequencies and the received DTMF frequencies. Thus, when a DTMF signal is present, the corresponding row and column filters will each produce an error signal dose to zero. Corresponding output signals from the row and column power meters are fed to respective row and column minimum error detection circuits 56, 57. These circuits identify which of the four error outputs of the respective row or column array has the lowest value, i.e. which of the adaptive notch filters of that row or column array is nearest in frequency to the sampled signal.

The particular pair of row and column outputs of minimum error from the error detection circuits 56, 57 provide an indication of the possible presence of a DTMF signal and further indicate the most probable frequency selection in a set of frequencies. If the minimum error values associated with the row and column numbers (indices) exceed preset values indicating a poor frequency match, it is assumed that no DTMF tones are in fact present and that the traffic can be treated as speech. Low error values corresponding to a respective row and column number indicate a good frequency match and the probable presence of a DTMF signal. The minimum values and indices (row and column numbers), together with the input power measure from power meter 51 are fed to logical operator 58 which performs a final check on the presence or absence of a DTMF signal pair and, if such a pair is present, performs the decoding to the corresponding dialled number output At the same time, if a DTMF pair is detected, the logical operator 58 outputs a DTMF flag which is used to inhibit input to the speech encoder 31 (FIG. 3). When the DTMF tone ceases, the loss of detection is confirmed by the logical operator so that the flag output is disabled and the TDM traffic is encoded as compressed speech.

The logical operator also receives a measure of the signal power from power meter 51. When a DTMF signal has been detected, this information is output from the logical operator 58 as DTMF level information. This information is used when the DTMF digit information is subsequently re-encoded as the DTMF tonal pair to achieve the correct signal level.

The logical operator determines the presence or absence of a DTMF tonal pair from the information provided from the power meter 51 and from the error detection circuits 56, 57. This information is used to determine the individual power level of the two frequencies, the difference between the two power levels (the twist level), the total power, and the tolerance from the true frequencies. A decision is then made to accept or eject the detection of a DTMF pair by determining whether signals fall within or outside the tolerance limits defined in ITU-T recommendation Q24.

In the arrangement of FIG. 5, the results of the DTMF detection are flagged based on forty samples over a 5 ms period. The errors are averaged over 5 ms by the power meters 54, 55.

Figure 6:
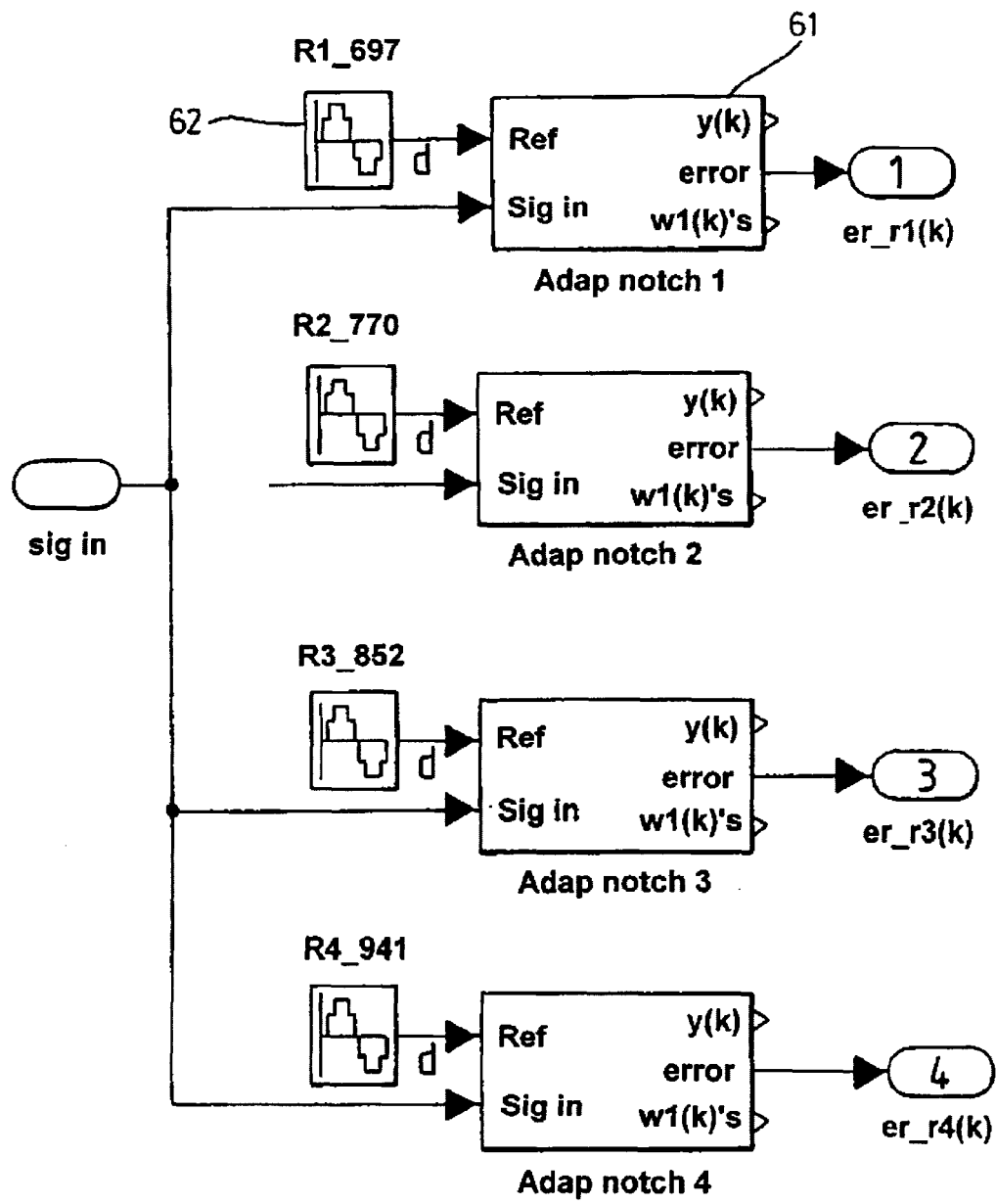
FIG. 6 shows the construction of a row or column filter array for use in the detector and decoder of FIG. 5.

The general construction of a row or column adaptive notch filter array is shown FIG. 6. Each row or column array comprises a set of four adaptive notch filter elements 61, each tuned to a respective row (column) frequency via a corresponding reference input 62 at that row (column) frequency. The output of each adaptive filter element comprises an error signal whose value provides an indication of a match between the respective reference frequency and an input sample. Thus, a low or zero error signal output indicates a match and a high error signal indicates a mismatch.

Figure 7:
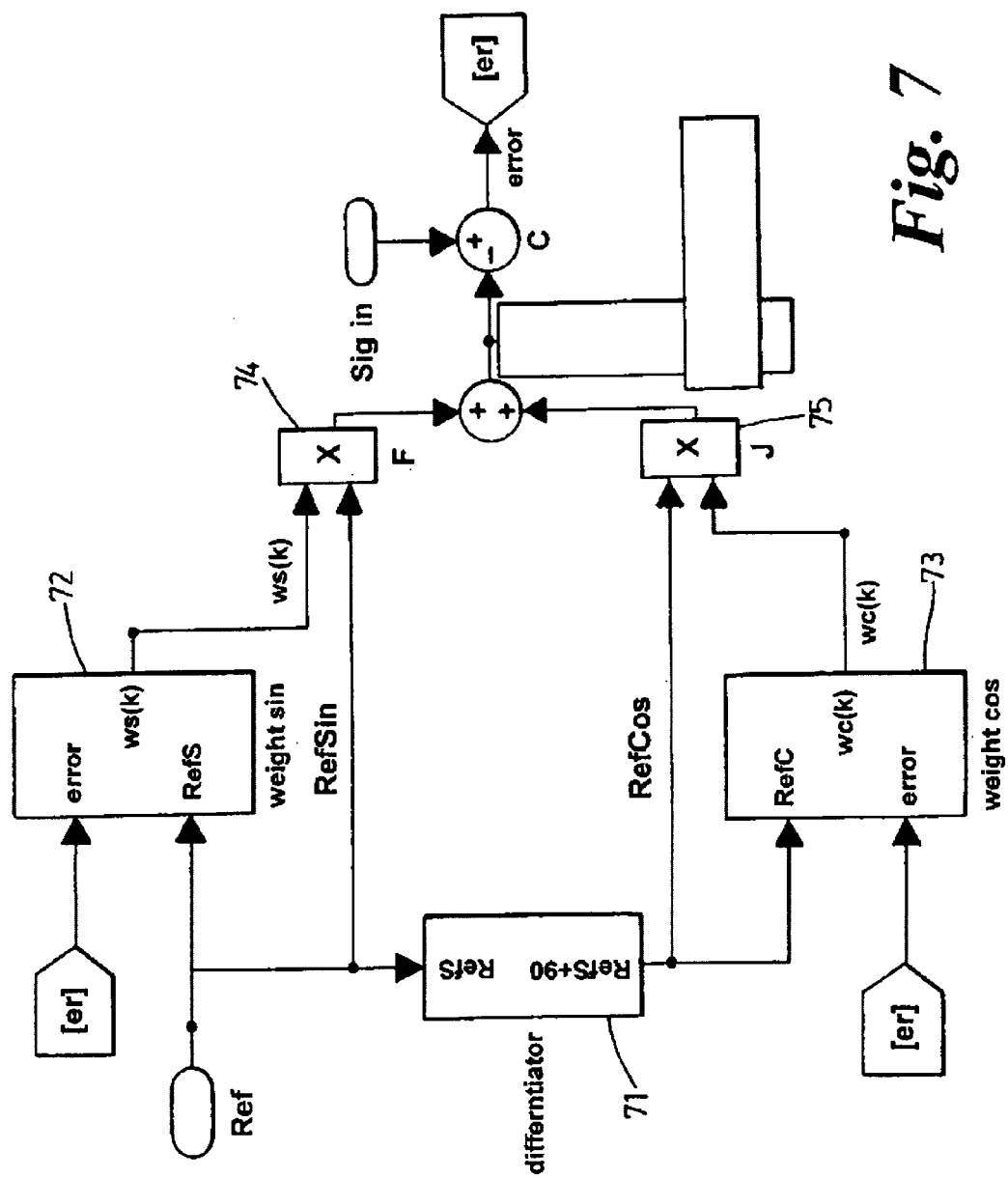
FIG. 7 illustrates the construction of an adaptive notch filter for a single tone with two coefficients.
Figure 8:
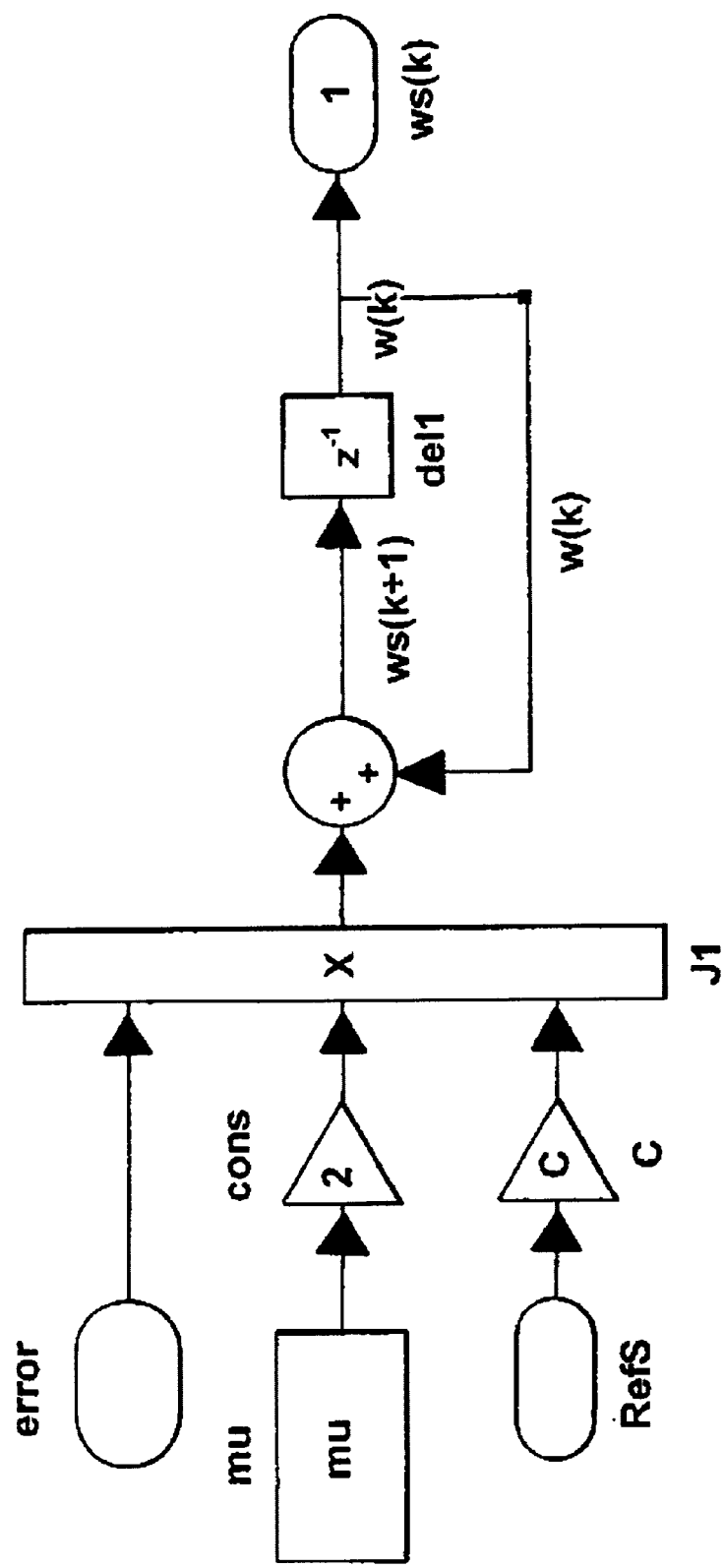
FIG. 8 illustrates weight updating of the adaptive notch filter of FIG. 7.

The construction of an adaptive notch filter element of figure is illustrated in FIG. 7. Sine and cosine components are derived from the reference signal via differentiator 71. The arrangement of FIG. 7 functions as an adaptive noise canceller with two adaptive weights ws(k) and wc(k) which are determined by weight generation stages 72, 73. The weights and the sine and cosine reference signals are fed to second stage filters 74, 75. The combined outputs of these second stages 74, 75 are subtracted from the sampled signal to provide an error signal output. The noise cancelling properties of the adaptive notch filter are here employed as a detector for a particular tone frequency. The general construction of a weight generation stage 72, 73 is shown in FIG. 8.

The Adaptive Notch Filter (ANF) algorithms employed in the filter construction of FIGS. 7 and 8 use the adaptive filter procedures in the following format.

$$W_{1,k+1}=W_{1k}+2\mu\epsilon_k X_{1k}$$

$$W_{2,k+1}=W_{2k}+2\mu\epsilon_k X_{1k} \qquad \text{Equation 1}$$

where $w_1$, $W_2$ etc. represents the input weights and where;

$$X_{1k}=C\cos(k\omega_0+\phi)$$

$$X_{2k}=C\sin(k\omega_0+\phi) \qquad \text{Equation 2}$$

where $\omega_0$ is the nominal frequency, $\phi$ is the phase difference, and C is a constant.

The bandwidth BW is given by the expression;

$$BW=2\mu C^2=\mu C^2/\pi T \text{ Herz}$$

Advantageously, the bandwidth of the filter is designed to match the receiving frequency tolerances defined in ITU Recommendation Q.24

A detailed analysis of adaptive notch filters is provided by B Widrow et al. in "Adaptive Signal Processing", Prentice Hall, 1985 ISBN 0-13-004029-01, the contents of which are incorporated herein by reference.

Figure 9:
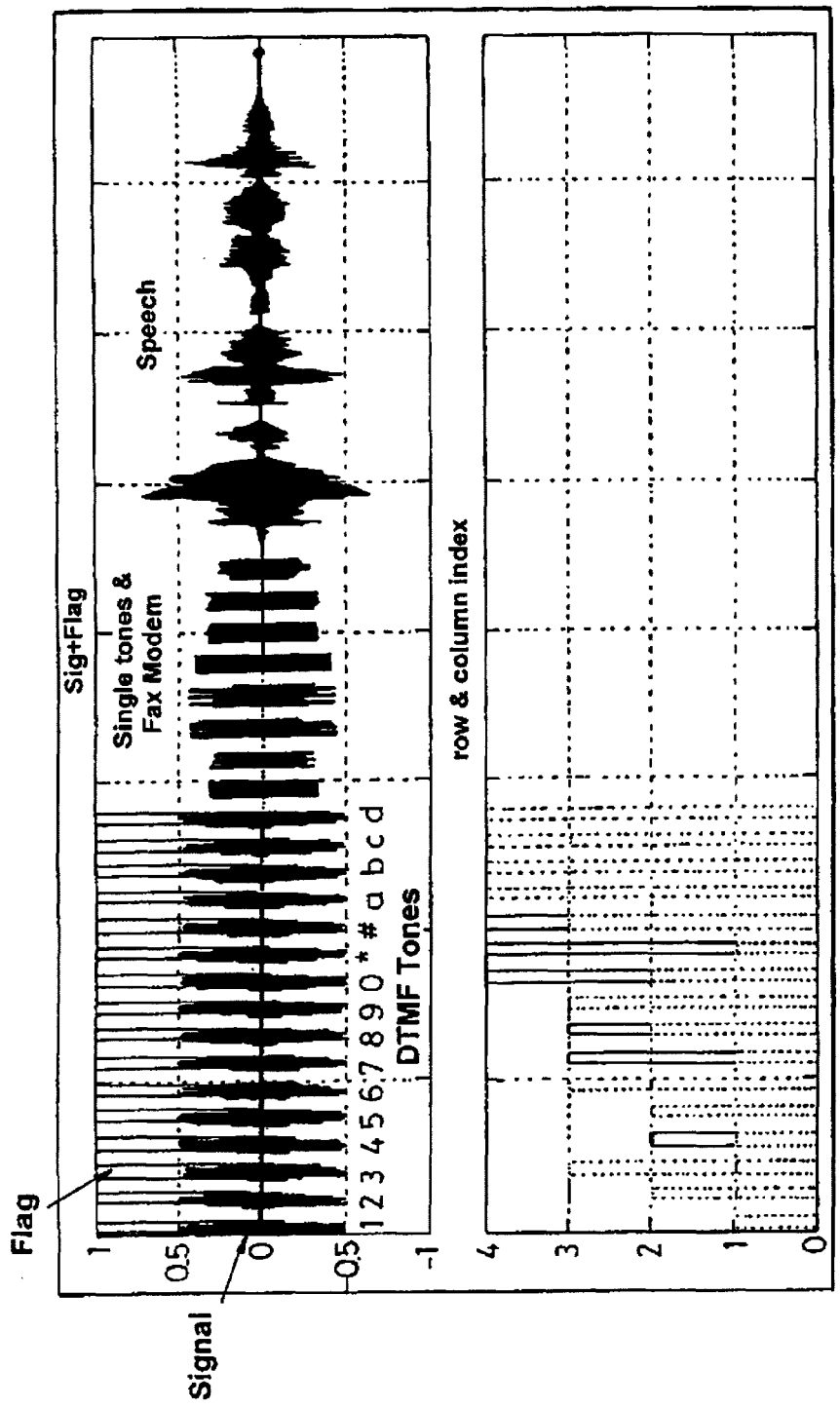
FIG. 9 illustrates the response of the detector and decoder of FIG. 5 to input DTMF,fax/modem tone and speech signals.

By way of example of the efficacy of the arrangement and method described above, FIG. 9 depicts a typical response of the tone detector to DTMF single and dual frequencies together with 2100 Hz fax and modem tones and speech signals. This shows the setting of the DTMF flag for genuine DTMF; signals, but no flag response to other tone signals such as fax and modem tones which can thus be processed in the same way as speech signals. Similarly, there is no false setting of the DTMF flag for speech signals. The lower part of the response diagram of FIG. 9 illustrates the decoding of detected pairs of DTMF tones into their equivalent digit representations.

It will be understood that the above description of a preferred embodiment is given by way of example only and that various modifications may be made by those skilled in the art without departing from the spirit and scope of the invention.

What is claimed is:

1. A method of transporting voice traffic and audio multi-tone signalling information representing user dialed digits from a connection based circuit-switched network to a packet-switched network, the method comprising notch filtering a plurality of signal samples, determining from said notch filtering the presence or absence of an audio multi-tone signal, in the absence of an audio multi-tone signal, compressing and packetising said voice traffic for transport over the packet-switched connectionless network, and, in the presence of an audio multi-tone signal, decoding that signal to corresponding digit information and transmitting that digit information over the packet-switched network, wherein a power level of said audio multi-tone signal is measured, and wherein said power level measurement is transmitted in association with said digit information over the packet-switched network.

2. A method according to claim 1, wherein said voice traffic is transported from the packet-switched network to a further circuit-switched network, and wherein said transmitted digit value is re-encoded as a corresponding pair of audio tone signals on egress from the packet-switched network using said power level measurement.

3. A method of transporting voice traffic and audio tone signalling information representing user dialed digits from a time division multiplex network to a packet-switched network, the method comprising compressing and packetising said voice traffic, sampling said time division multiplex voice traffic with first and second sets of adaptive notch filters so as to provide an indication of presence or absence of pairs of audio tone signals representing call number information in said voice traffic, and, when the presence of a said pair of tone signals is indicated, decoding that pair of tone signals to a corresponding digit value, and transmitting that digit value across the packet-switched network, wherein a power level of a said pair of audio tone signals is measured, wherein said power level measurement is transmitted together with the digit value over the packet-switched network.

4. A method as claimed in claim 3, wherein each of said adaptive notch filters is arranged as a single frequency noise canceller with first and second adaptive weights.

5. A method as claimed in claim 4, wherein a said pair of tone signals is detected by determining the frequency and power level of each signal of the pair, and comparing the frequency and power level with predetermined reference values.

6. A method as claimed in claim 5, wherein a difference in power levels of the signals of the pair is determined.

7. A method as claimed in claim 6, wherein said packet-switched network is an asynchronous transfer mode (ATM) network.

8. A method as claimed in claim 7, wherein said time division multiplex network and said packet-switched network are interfaced by an ATM switch.

9. A method according to claim 3, wherein said voice traffic is transported from the packet-switched network to a further time division multiplex network, and wherein said transmitted digit value is re-encoded as a corresponding audio multi-tone signal on egress from the packet-switched network using said power level measurement.

10. A computer-readable storage medium tangibly embodying a computer-readable program code executable by a computer to perform the method of transporting voice traffic and audio tone signaling information representing user dialed digits from a time division multiplex network to a packet-switched network, the method comprising compressing and packetising said voice traffic, sampling said time division multiplex voice traffic with first and second sets of adaptive notch filters so as to provide an indication of presence or absence of pairs of audio tone signals representing call number information in said traffic, and, when the presence of a said pair of tone signals indicated, decoding that pair of tone signals to a corresponding digit value, and transmitting that digit value across the packet-switched network, wherein a power level of a said pair of audio tone signals is measured, wherein said power level measurement is transmitted together with the digit value over the packet-switched network.

11. An arrangement for transporting voice traffic and audio tone signalling information from a time division multiplex network to a packet-switched network, the arrangement comprising speech encoding and compression means for compressing and packetising said voice traffic, a plurality of adaptive notch filters for sampling said time division multiplex voice traffic so as to provide an indication of presence or absence of an audio tone signal in said voice traffic, logic means for decoding an audio tone signal to a corresponding digit value when said audio tone signal has been detected, power level measurement means for determining a power level of said audio tone signal, and means for transmitting said power level measurement together with the digit value over the packet-switched network.

12. An arrangement as claimed in claim 11, wherein said voice traffic is transported from the packet-switched network to a further time division multiplex network, and wherein said transmitted digit value is re-encoded as a corresponding audio tone signal on egress from the packet-switched network using said power level measurement.

13. An arrangement as claimed in claim 11, wherein said logic means is arranged to detect a tone signal pair by comparing the frequency and power level of each signal of the pair with predetermined reference values.

14. An arrangement as claimed in claim 11, wherein each of said adaptive notch filters is arranged as a single frequency noise canceller with first and second adaptive weights.

15. A communications network arrangement comprising a time division multiplex (TDM) network in which narrow band traffic is transported in frames, and a packet-switched network in which said narrow band traffic is transported in a compressed form in cells or packets, wherein, within the TDM network, signalling of user dialed digit information is performed by the transmission of dual tone multi-frequency (DTMF) pairs of signal tones, and wherein a boundary between the TDM and packet-switched networks incorporates signalling tone detection means comprising a plurality of adaptive notch filters for sampling said TDM voice traffic so as to provide an indication of presence or absence of a pair of audio tone signals in said voice traffic, and logic means for decoding a pair of tone signals to a corresponding digit value when said tone signal pair has been detected, power level measurement means for determining a power level of a said pair audio tone signals, and means for transmitting said power level measurement together with the digit value corresponding to the pair of audio tone signals over the packet-switched network.

16. An arrangement as claimed in claim 15, wherein said voice traffic is transported from the packet-switched network to a further time division multiplex network, and wherein said transmitted digit value is re-encoded as a corresponding pair of audio tone signals on egress from the packet-switched network using said power level measurement.

17. An arrangement as claimed in claim 15, wherein said logic means is arranged to detect a tone signal pair by comparing the frequency and power level of each signal of the pair with predetermined reference values.

18. An arrangement as claimed in claim 15, wherein each of said adaptive notch filters is arranged as a single frequency noise canceller with first and second adaptive weights.

19. A computer-readable storage medium tangibly embodying a computer-readable program and executable by a computer to perform the method of transporting voice traffic and audio multi-tone signalling information representing user dialed digits from a circuit-switched network to a packet-switched network, the method comprising notch filtering a plurality of signal samples, determining from said notch filtering the presence or absence of an audio multi-tone signal, in the absence of an audio multi-tone signal, compressing and packetising said voice traffic for transport over the packet-switched network, and, in the presence of an audio multi-tone signal, decoding that signal to corresponding digit information and transmitting that digit information over the packet-switched network, wherein a power level of said audio multi-tone signal is measured, and wherein said power level measurement is transmitted in association with said digit information over the packet-switched network.

\* \* \* \* \*